May 9, 1944.

P. M. PREZIOSI 2,348,644

MAGAZINE WORK HOLDING FIXTURE

Filed April 26, 1943

INVENTOR.
PETER M. PREZIOSI.
BY
Frank H. Harmon
ATTORNEY

May 9, 1944.  P. M. PREZIOSI  2,348,644
MAGAZINE WORK HOLDING FIXTURE
Filed April 26, 1943  2 Sheets-Sheet 2
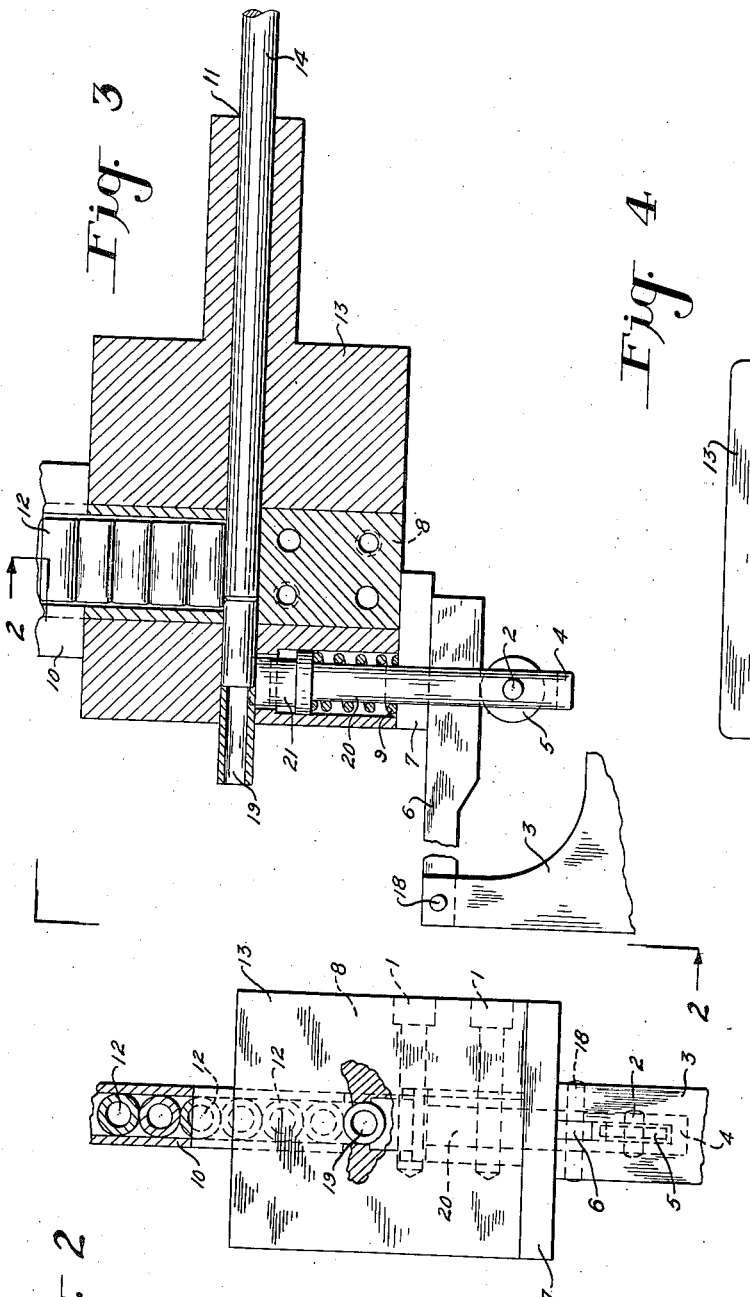
INVENTOR.
PETER M. PREZIOSI
BY
Frank H. Harmon
ATTORNEY Patented May 9, 1944

2,348,644

UNITED STATES PATENT OFFICE 2,348,644

MAGAZINE WORK-HOLDING FIXTURE

Peter M. Preziosi, Cleveland Heights, Ohio, assignor to Jack & Heintz, Inc., Bedford, Ohio, a corporation of Ohio Application April 26, 1943, Serial No. 484,581

2 Claims. (Cl. 29—60)

This invention relates in general to work holding devices and has for one of its primary objects to provide a work holding device which will have a magazine feed, the work from which may be fed automatically into position for a machining operation, to provide means for clamping the work in position and to automatically remove the work from its fixed clamped position upon removal of the work from the tool.

To this end it is proposed to provide a work holding device in which the work is firmly held in place by a spring actuated mechanism during a machining operation and to so arrange the spring actuated mechanism that it will become disengaged from the work by a cam action which will occur at the completion of a machining operation and after the removal of the work from the tool.

With the foregoing and other objects in view, the invention resides in the combination of parts and in the details of construction hereinafter set forth in the following specification and appended claims, certain embodiments thereof being illustrated in the accompanying drawings in which:

Figure 2 is similar to Figure 1 except that a frontal elevation is shown at right angles to Figure 1.

Figure 3 is a view in side elevation similar in general to Figure 1, showing the positions the parts assume when the machining operation on the work has been completed, the spring actuated mechanism has been disengaged from the work by a cam action, and the work is dislodged from its fixed position by the next piece of work as it is fed from the magazine to the machining position.

Figure 4 is a plan view of the work holding portion of the device.

Figure 1:
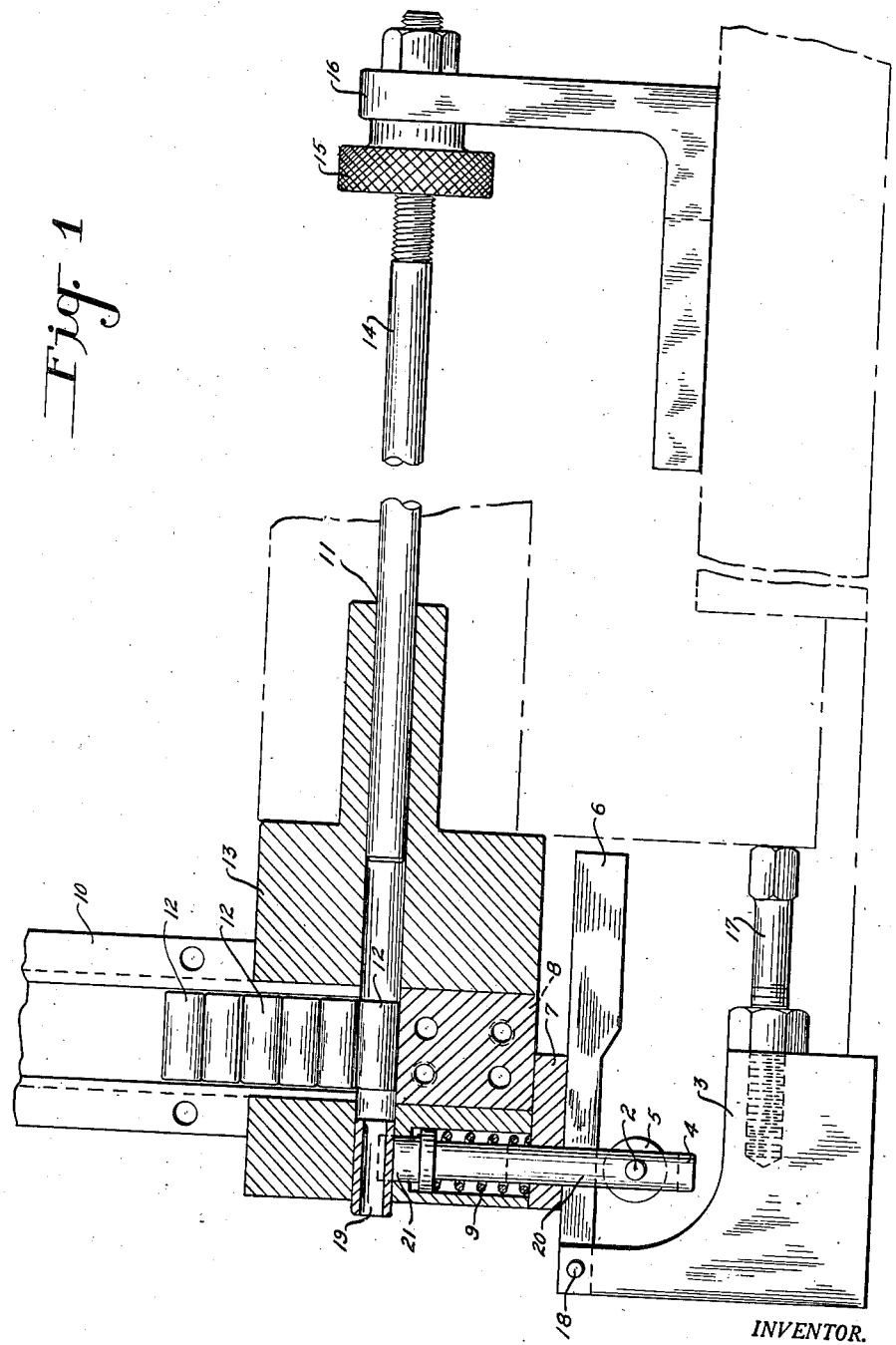
Figure 1 is a view in side elevation of the assembly including a base, a work supporting bracket, and a magazine feed, work holding device as supported by the bracket, the work being shown in its fixed position awaiting the machining operation.

Referring more particularly to the drawings, a frame consisting of a support 3 carries a cam 6 movable about a pivot 18 in alignment with the movement of the work holding device. The work 19 is engaged by a spring actuated clamping mechanism 4, which has a work engaging head 21, having a radius equal to the radius of the work, and a slotted shaft tailpiece 20. A wheel 5 which is slidably and rotatably mounted by means of a pin 2 in the tailpiece 20 engages cam 6 upon removal of the work from the machining tool, disengaging a clamping head 21 carried by a shaft 1 from the work 19 against the action of a spring 9. Casing member 7 is a structural part of the body of the device and acts as a vertical guide for a slotted shaft tailpiece 20.

The casing 13 is recessed to removably receive a barrel 8 which in turn receives the work from the magazine feed. The barrel 8 is secured in position in the casing 13 by means of bolts 1. A compression spring 9, encircling shaft 20, may be of varied strength to suit the application. A suitably constructed magazine feed 10 is mounted so as to feed the work into casing 13. Casing 13 forms the main portion of the body of the work holding device. A rod 14 is threaded at one end so as to be adjustable and is fitted into a hole 11 of casing 13 where, upon movement of the holding device away from the machining tool, it forces the first piece of the work 12 from the magazine feed into the machining position, thereby dislodging the work previously machined. A lock nut 15 holds the adjustment of rod 14 fixed with relation to the work. An angle 16 forms the supporting member for rod 14. The movement of the work holding device in the direction of the machining tool is limited by means of a set screw 17 in cam supporting member 3.

Thus it may be seen that by various adjustments of the set screw 17 and rod 14 along with different tappings in member 13 and different sizes of magazine feed, work of innumerable dimensions may be handled by this work holding device.

I claim:

1. A magazine feed work holding device comprising a supporting housing, a work holding casing, a barrel carried in a recess in said casing, a magazine feed mounted on the casing to feed work into said barrel, a fixedly supported adjustable rod extending through the casing and the barrel, said casing and barrel being linearly movable with respect to the rod to cause said rod to force work from the receiving position of the barrel into a machining position at the end of the casing and to eject a previously machined piece of work in the process as the work holding casing is moved away from the machining position, a spring actuated clamp located adjacent to the machining position within said casing and having a concave work engaging head with a slotted shaft tailpiece portion extending below the casing, to firmly hold the work in the machining position, a roller mounted in the slotted portion of the clamp tailpiece below the casing, and a cam member, frictionally pivoted at one end to a portion of the supporting housing and having its free end extending through the slotted tailpiece portion of the clamp between the casing and the roller, to cause the disengagement of the spring actuated clamp from the work when the roller rides on the cam surface as the casing is moved from the machining position and to allow the re-engagement of said clamp with the work as the casing is returned to the machining position and the roller no longer contacts the cam surface.

2. A magazine feed work holding device comprising a supporting housing, a work holding casing having a barrel removably mounted therein, said casing and barrel having aligned bores and an adjustable but fixedly supported rod extending therein, a magazine feed mounted above and extending into said casing to feed work to the barrel, said casing being linearly movable with respect to said rod to bring the work into engagement therewith to force the work from the receiving portion of the barrel into a machining position at the end of the bore of said casing and to eject a previously machined piece of work in the process as the casing is moved away from the machining position towards the other end of said rod, a spring actuated work engaging clamp carried by said casing, a roller mounted on the portion of the clamp extending below the casing, and a pivoted arm attached at one end to a portion of the supporting housing, and having its free end, projecting between the casing and the roller, provided with a cam surface to be engaged by said roller upon the retracting movement of said casing, to cause the disengagement of the clamp from the work as the casing is retracted from the machining position and to allow the re-engagement of the clamp with the work as the casing is returned to the machining position.

PETER M. PREZIOSI.